United States Patent
Hsu et al.

(10) Patent No.: US 10,057,804 B2
(45) Date of Patent: *Aug. 21, 2018

(54) TRAFFIC SHAPING MECHANISM FOR UE POWER SAVING IN CONNECTED MODE

(71) Applicant: MEDIATEK INC., Hsinchu (TW)

(72) Inventors: Chia-Chun Hsu, New Taipei (TW); Chie-Ming Chou, Taichung (TW)

(73) Assignee: MediaTek Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/320,873

(22) Filed: Jul. 1, 2014

(65) Prior Publication Data
US 2015/0009815 A1    Jan. 8, 2015

Related U.S. Application Data

(60) Provisional application No. 61/842,459, filed on Jul. 3, 2013, provisional application No. 61/842,466, filed on Jul. 3, 2013.

(51) Int. Cl.
*H04W 28/02* (2009.01)
*H04W 52/02* (2009.01)
(Continued)

(52) U.S. Cl.
CPC ......... *H04W 28/0221* (2013.01); *H04L 47/14* (2013.01); *H04L 47/24* (2013.01);
(Continued)

(58) Field of Classification Search
CPC ............. H04W 28/0221; H04W 76/28; H04W 28/0205; H04W 28/0231; H04W 52/0216;
(Continued)

(56) References Cited

U.S. PATENT DOCUMENTS

| 2003/0095560 A1* | 5/2003 | Arita ................. H04L 12/44 370/431 |
| 2003/0123390 A1 | 7/2003 | Takase et al. ............. 370/230.1 |

(Continued)

FOREIGN PATENT DOCUMENTS

| CN | 101047984 A | 10/2007 |
| CN | 101821966 A | 10/2007 |

(Continued)

OTHER PUBLICATIONS

International Search Report and Written Opinion of International Search Authority for PCT/CN2014/081590 dated Sep. 28, 2014(11 pages).

(Continued)

*Primary Examiner* — Christopher Crutchfield
*Assistant Examiner* — Tito Pham
(74) *Attorney, Agent, or Firm* — Imperium Patent Works; Helen Mao; Zheng Jin

(57) ABSTRACT

A method of uplink shaping and scheduling request (SR) prohibition in RRC Connected Mode is proposed. A UE applies DRX operation in a wireless network, the UE is in RRC Connection mode. The UE processes a data packet to be sent to the network. The data packet is associated with a traffic type. If the data packet belongs to a normal traffic type, then the UE transmits a scheduling request (SR) to the network. If the data packet belongs to a background traffic type, then the UE buffers the data packet and is prohibited from sending the SR to the network until a triggering condition is satisfied. By reducing the activity of uplink transmission, UE power consumption is improved and signaling overhead is reduced.

18 Claims, 7 Drawing Sheets

(51) Int. Cl.
- *H04W 72/04* (2009.01)
- *H04W 72/12* (2009.01)
- *H04L 12/801* (2013.01)
- *H04L 12/851* (2013.01)
- *H04L 12/823* (2013.01)
- *H04W 76/28* (2018.01)
- *H04W 76/38* (2018.01)

(52) U.S. Cl.
CPC ......... *H04L 47/32* (2013.01); *H04W 28/0205* (2013.01); *H04W 28/0231* (2013.01); *H04W 52/0216* (2013.01); *H04W 52/0251* (2013.01); *H04W 72/0413* (2013.01); *H04W 72/1242* (2013.01); *H04W 76/28* (2018.02); *H04W 76/38* (2018.02); *Y02D 70/00* (2018.01); *Y02D 70/1262* (2018.01); *Y02D 70/21* (2018.01); *Y02D 70/24* (2018.01); *Y02D 70/25* (2018.01)

(58) Field of Classification Search
CPC ......... H04W 52/0251; H04W 72/0413; H04W 72/1242; H04L 47/14; H04L 47/24; H04L 47/32
See application file for complete search history.

(56) References Cited

U.S. PATENT DOCUMENTS

| | | | |
|---|---|---|---|
| 2004/0037286 A1 | 2/2004 | Huang et al. | 370/394 |
| 2007/0109970 A1 | 5/2007 | Galimberti et al. | 370/235 |
| 2009/0092202 A1 | 4/2009 | Kim et al. | 375/295 |
| 2011/0307795 A1 | 12/2011 | Guillou et al. | 715/738 |
| 2012/0163305 A1 | 6/2012 | Nimbalker et al. | 370/329 |
| 2012/0165013 A1 | 6/2012 | Nishida et al. | 455/435.1 |
| 2012/0257501 A1 | 10/2012 | Kucharczyk | 370/235 |
| 2012/0269154 A1* | 10/2012 | Wang | H04W 72/1242 370/329 |
| 2013/0021995 A1* | 1/2013 | Ehsan | H04W 72/1284 370/329 |
| 2013/0039339 A1* | 2/2013 | Rayavarapu | H04W 76/028 370/331 |
| 2013/0083713 A1* | 4/2013 | Johansson | H04W 52/0225 370/311 |
| 2013/0084869 A1* | 4/2013 | Johansson | H04W 76/04 455/436 |
| 2013/0121181 A1 | 5/2013 | Kikuzuki | 370/252 |
| 2013/0242726 A1 | 9/2013 | Zhu et al. | 370/229 |
| 2013/0286982 A1 | 10/2013 | Chen et al. | 370/329 |
| 2013/0311918 A1 | 11/2013 | McCoy et al. | 715/765 |
| 2015/0036569 A1* | 2/2015 | Vannithamby | H04W 76/048 370/311 |
| 2015/0045024 A1* | 2/2015 | Lunden | H04W 48/16 455/434 |

FOREIGN PATENT DOCUMENTS

| | | | |
|---|---|---|---|
| CN | 102045853 A | 5/2011 | |
| CN | 102547610 A | 7/2012 | |
| CN | 103037481 A | 4/2013 | |
| EP | 2579672 A1 | 10/2011 | |
| EP | 2579672 A1 | 4/2013 | |
| WO | WO2013013073 A2 | 1/2013 | |

OTHER PUBLICATIONS

International Search Report and Written Opinion of International Search Authority for PCT/CN2014/081593 dated Sep. 28, 2014(11 pages).

USPTO, Office Action for related U.S. Appl. No. 14/320,894 dated Sep. 24, 2015.

USPTO, Office Action for related U.S. Appl. No. 14/320,894 dated Jun. 1, 2016.

USPTO, Office Action for related U.S. Appl. No. 14/320,894 dated Dec. 1, 2016.

SIPO, search report for the CN patent application 201480035614.1 (no English translation is available) dated Mar. 2, 2018 (8 pages).

\* cited by examiner

DRX CONFIGURATION (CONDITION 0)

BUFFER SIZE THRESHOLD (CONDITION 1)

PERIODIC ACCESS (CONDITION 2)

DELAY BOUND CONSTRAINT (CONDITION 3)

CHANNEL QUALITY CONSTRAINT (CONDITION 4)

UE SPEED CONSTRAINT (CONDITION 5)

TRAFFIC SHAPING MECHANISM FOR UE POWER SAVING IN CONNECTED MODE

CROSS REFERENCE TO RELATED APPLICATIONS

This application claims priority under 35 U.S.C. § 119 from U.S. Provisional Application No. 61/842,459, entitled "Traffic Shaping Mechanism for UE Power Saving in Connected Mode," filed on Jul. 3, 2013; U.S. Provisional Application No. 61/842,466, entitled "Traffic Shaping Mechanism for UE Power Saving in Idle Mode," filed on Jul. 3, 2013 the subject matter of which is incorporated herein by reference.

TECHNICAL FIELD

The disclosed embodiments relate generally to mobile communication networks, and, more particularly, to uplink traffic shaping for UE power saving in RRC Connected mode.

BACKGROUND

Nowadays, popular applications on smartphones have much more sophisticated traffic pattern than what the network architect originally had in mind. It turns out that the existing networks do not support popular applications that well. For example, chattiness of applications where traffic is based on user interaction results in inconstant QoS requirement over time. Another example is "keep alive messages" or background traffic of application or OS where traffic has short and infrequent data sessions. When bringing this type of traffic, it creates a number of issues. First, many always-on applications generate frequent traffic, e.g., for keep alive and status update, which brings significant problems. Second, the signaling in the network has increased a lot due to frequent context establishment and release, e.g., for Connected—Idle transitions. In many networks, this becomes a severe dimensioning problem for the whole network. Third, the UE batter life is short. Finally, for devices that generate always-on sparse traffic, the overhead is very large as compared to the data payload transmission.

In 3GPP LTE/LTE-A systems, operations could be divided to two radio resource control (RRC) states: RRC C_CONNECTED and RRC_IDLE. In RRC_CONNECTED mode, an eNB would keep UE's context (security, id) and process radio resource management (RRM) for that UE. RRM here includes data scheduling, link monitoring (MCS adaption), handover, etc. A UE is ensured to make seamless data transmission with eNB when the UE is in RRC_CONNECTED mode. The eNB may command UE to perform RRM measurement and make handover (HO) decisions after receiving reports that indicate serving cell's signal quality is not good. HO decision is done in an inter-eNB negotiation fashion, including UE context forwarding and initial configuration handled in RRC_CONNECTED mode.

Since radio resources and network capacity are limited (e.g., by backhaul capacity), it is impossible to keep all UEs in RRC_CONNECTED mode. Inactive UEs are therefore released to RRC_IDLE mode. The release decision may depend on (1) Inactivity duration, (2) UE's access priority, and (3) QoS. Once a UE goes to RRC_IDLE mode, eNB also clears its context.

An eNB may configure discontinuous reception (DRX) for a connected UE. Therefore, the UE only needs to monitor the PDCCH at active period. The UE is allowed to sleep (e.g. turn off its TX/RX transceiver) to achieve power saving at sleep period. The DRX operation is controlled by several parameters signaled through RRC message. For uplink transmission, upon packet arrival, UE transmits Scheduling Request (SR) (D-SR on PUCCH or RACH) to inform eNB. In legacy systems, SR transmission is independent of DRX procedure. Thus, SR transmission during DRX degrades the potential power saving since UE may transmit SR at sleep period. Furthermore, when traffic is delay tolerant and small, it is very inefficient to trigger SR during sleep period, since the data can be delayed and there is no reason to decrease the opportunity of power saving or shorten UE battery life.

It has been shown that although there is only 30% data traffic oriented from smartphone devices, they would contribute 80% signaling traffic. This demonstrates that new data applications running on the smartphone have significant impacts on network capacity. Furthermore, it has been observed that the problem comes from so called "background traffic"—due to its small packet and long packet inter-arrival time, current Discontinuous Reception Mechanism (DRX) may not work efficiently. In addition, background traffic also increases the number of RRC state transition, which creates more signaling. As a result, UE battery life is degraded while those applications are running on smartphone devices.

To solve the problem, two issues shall be addressed. First, how to decide when to send the UE to RRC_IDLE mode. In general, the decision relies on a proper RRC release timer that is controlled by eNB. The timer is re-started upon transmitting each packet, and if the timer is expired, UE is released. Usually, a simple default value is used for the timer. Improvement is expected if the timer is adjusted according to on-going traffic. Second, how to decide when to transmit SR. In legacy system, when a packet arrives at layer-2 buffer, UE would transmit the SR as soon as possible. Considering not all packets from smartphones are delay sensitive, SR transmission for delay-tolerant packets can be postponed. Mechanisms for uplink shaping and SR prohibition is thus desirable for additional power saving.

SUMMARY

As smartphone becomes popular in recent years, the new traffic behavior generated by the new applications on the platform has brought big impact on the signaling overhead and power consumption performance to the modern cellular network. In this invention, we propose uplink shaping, which is to aggregate uplink traffic in RRC Connected Mode. By reducing the individual activity of uplink transmission, UE power consumption is improved and signaling overhead is reduced.

In one novel aspect, a method of uplink shaping and scheduling request (SR) prohibition in RRC Connected Mode is proposed. A UE applies DRX operation in a wireless network, the UE is in RRC Connection mode. The UE processes a data packet to be sent to the network. The data packet is associated with a traffic type. If the data packet belongs to a normal traffic type, then the UE transmits a scheduling request (SR) to the network. If the data packet belongs to a background traffic type, then the UE buffers the data packet and is prohibited from sending the SR to the network until a triggering condition is satisfied.

In one embodiment, the triggering condition is at least one of fulfilling the UE entering an active period of the DRX operation, the buffered data has reached a predefined buffer size threshold, the SR has been delayed for a predefined periodicity, at least one of the buffered data packets has reached a delay bound, a channel quality is above a channel quality threshold, and a UE speed is slower than a speed threshold.

In one embodiment, a controller (UE, eNB, or MME) may choose one of the shaping mechanism or a hybrid implementation to meet its requirement. For example, UE can determine to apply which shaping mechanism and triggering condition(s) based on at least one of the channel quality of the UE, the UE speed, a UE battery life, a UE screen status, network loading, traffic type, a number of SR, and configured RRC parameters.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
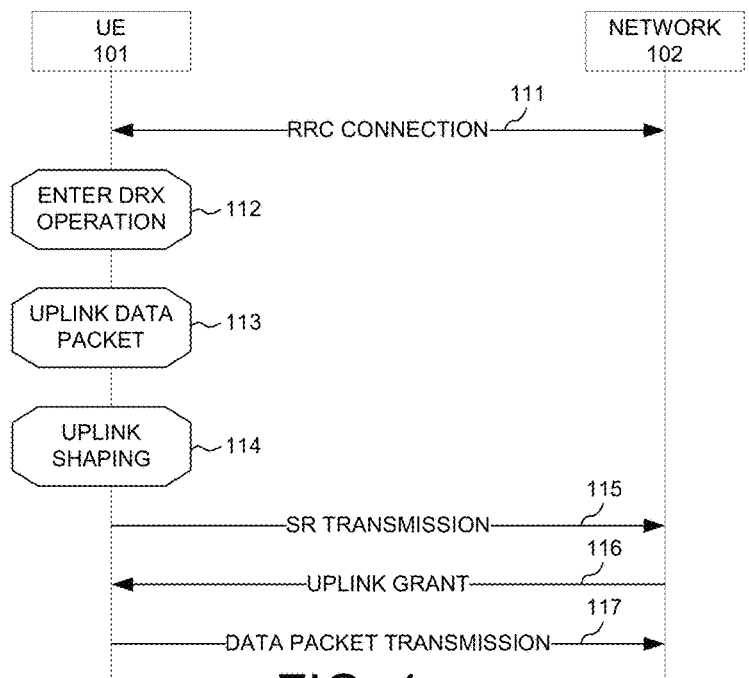
FIG. 1 illustrates a top-level signaling procedure for uplink shaping in RRC Connected mode in accordance with one novel aspect.

FIG. 1 illustrates a top-level signaling procedure for uplink shaping in RRC Connected mode in accordance with one novel aspect. In step 111, a user equipment UE 101 establishes a radio resource control (RRC) connection with network 102. UE 101 is in RRC Connected mode. In step 112, UE 101 enters a discontinuous reception (DRX) operation for power saving. The DRX operation comprises a plurality of DRX cycles, and each DRX cycle includes active period (active state) and sleep period (sleep state). During active period, a UE monitors a physical downlink control channel (PDCCH), while the UE is allowed to sleep (e.g., turn off its TX/RX transceiver) to achieve power saving during sleep period. In step 113, UE 101 receives a packet to be transmitted to the network. Upon uplink packet arrival, the UE should transmits a Scheduling Request (SR) to inform its eNB. In legacy systems, SR transmission is made upon SR resources, which is independent of DRX operation. Thus, SR transmission during sleep period degrades the potential power saving. Furthermore, when traffic is delay tolerant and packet size is small, it is very inefficient to trigger SR transmission during sleep period, since the data can be delayed and there is no reason to decrease the opportunity of power saving or shorten UE battery life.

In accordance with one novel aspect, in step 114, UE 101 performs uplink shaping before SR transmission. Uplink shaping in RRC Connected mode is a kind of buffering where the UE buffers and aggregates the uplink packets into a layer-2 buffer and does not transmit SR immediately until a later time when certain triggering condition has been met. Note that when UE is receiving downlink packets, there is no need to do uplink shaping because UE is in active period and no power degradation while SR transmission during this period. The controller (e.g., UE or base station (eNB) or mobility management entity (MME)) can decide the SR shaping criteria and forward or recommend the decision to the corresponding entity. In step 115, UE 101 sends out the SR to network 102 upon satisfying one or more triggering conditions. In step 116, UE 101 receives an uplink grant from network 102 in response to the scheduling request. Finally, in step 117, UE 101 transmits the uplink data packet to the network.

Figure 2:
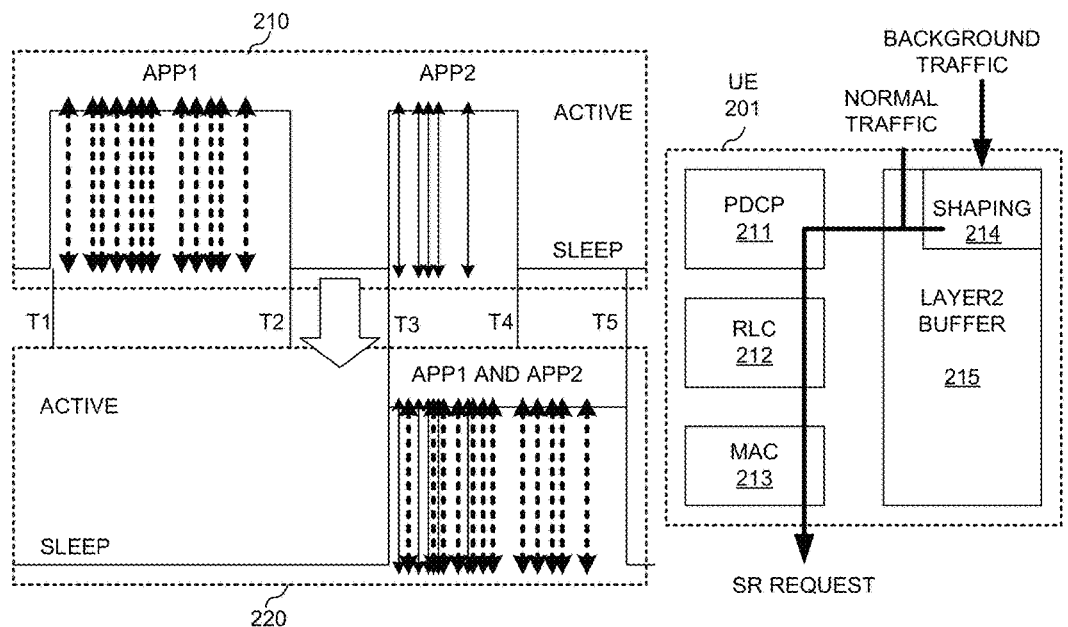
FIG. 2 illustrates uplink shaping for different traffic type in RRC Connected mode in accordance with one novel aspect.

FIG. 2 illustrates uplink shaping for different traffic type in RRC Connected mode in accordance with one novel aspect. In the example of FIG. 2, UE 201 comprises several protocol layer processing modules including a packet data convergence protocol (PDCP) module 211, a radio link control (RLC) module 212, a media access control (MAC) module 213, a shaping module 214, and a layer-2 buffer 215. UE 201 is configured with DRX operation having alternating active period and sleep periods in each DRX cycle. Suppose UE 201 has two applications running, APP1 and APP2. As depicted by box 210, UE 201 encounters traffic from APP1 during time T1-T2 period, and therefore enters active period and transmits SR to inform its eNB for uplink transmission. UE 201 then enters sleep period from T2-T3. Later, UE 201 again encounters traffic from APP2 during time T3-T4 period, and therefore enters active period again and transmits SR to inform eNB for uplink transmission. UE 201 then enters sleep from T4. If the traffic from APP1 is a background traffic type, e.g., type of traffic that is associated with UE in a background mode and/or the data packet has a low QoS requirement and/or the data packet has a small packet size, then UE 201 can delay the SR transmission until a later time.

In accordance with one novel aspect, as depicted by box 220, UE 201 encounters traffic from APP1 during time T1-T2 period, and checks whether the traffic type is background traffic or normal traffic via shaping module 214. If the traffic type is normal traffic, then UE 201 follows the same procedure as depicted by box 210—UE 201 enters active period and transmits SR to inform its eNB for uplink transmission. On the other hand, if the traffic type is background traffic, then UE 201 buffers the data packets into layer-2 buffer 215 and stays in sleep period from time T1 to T3 to save power. At time T3, UE 201 again encounters traffic from APP2. Based on certain triggering condition, UE 201 decides to enter active period and transmits SR to inform its eNB for uplink transmission for both APP1 traffic and APP2 traffic from time T3 to T5. Because UE 201 performs uplink shaping for background traffic from APP1, UE 201 is able to delay SR transmission and stay in sleep period longer for extra power saving. Because uplink shaping in RRC Connected mode is equivalent to prohibiting SR transmission, it is also referred to as SR prohibition in the following discussion. Note that in LTE systems, a UE shall identify whether there is a pending SR regardless of traffic type, and the UE is allowed to send SR only if no previous SR is pending. While this is also a prohibition behavior, it is unrelated to the SR prohibition discussed in this invention.

Figure 3:
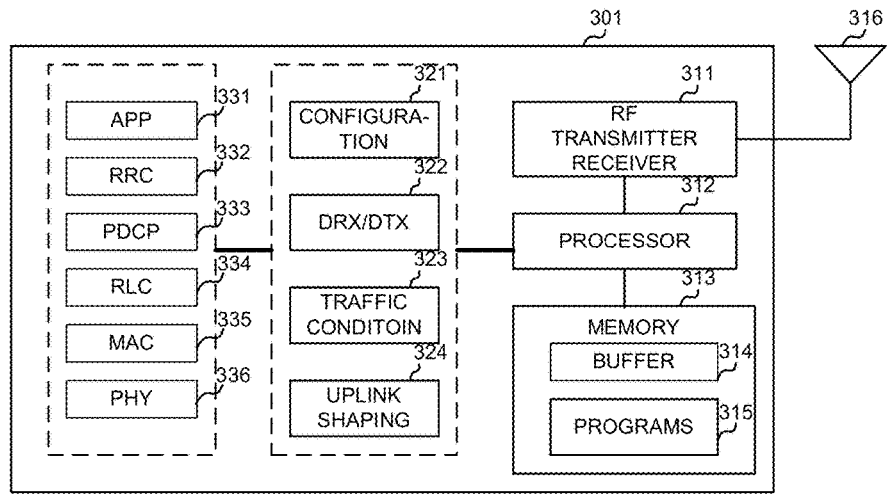
FIG. 3 illustrates an exemplary block diagram of a UE that supports some embodiments of the invention.

FIG. 3 illustrates an exemplary block diagram of a UE 301 that supports some embodiments of the invention. The UE has RF transceiver module 311, coupled with antenna 316, receives RF signals from antenna 316, converts them to baseband signals and sends them to processor 312. RF transceiver 311 also converts received baseband signals from the processor 312, converts them to RF signals, and sends out to antenna 316. Processor 312 processes the received baseband signals and invokes different functional modules to perform features in the UE. Memory 313 stores buffer 314 and program instructions and data 315 to control the operations of the UE. UE 301 also comprises several protocol layer stacks including application layer APP 331, radio resource control layer RRC 332, packet data convergence protocol layer PDCP 333, radio link control layer RLC 334, media access control layer MAC 335, and physical layer PHY 336.

FIG. 3 further illustrates functional modules 321 to 324 in the UE that carry out embodiments of the current invention. The functional modules may be implemented by hardware, firmware, software, or any combination thereof. Configuration module 321 receives configuration parameters from the network (e.g., RRC and DRX parameters) and performs various control and configuration functions accordingly. DRX/DTX module 322 determines whether and when to transit into DRX/DTX states based on DRX/DTX parameters. Traffic condition module 323 determines uplink traffic type, e.g., either background traffic or normal traffic, as well as various traffic status associated with the uplink traffic, e.g., packet buffer size and packet delay bound. Uplink shaping module 324 determines when to perform uplink shaping and SR prohibition based on the uplink traffic type. Uplink shaping module 324 also determines when to perform SR transmission based on various triggering conditions.

Figure 4A:
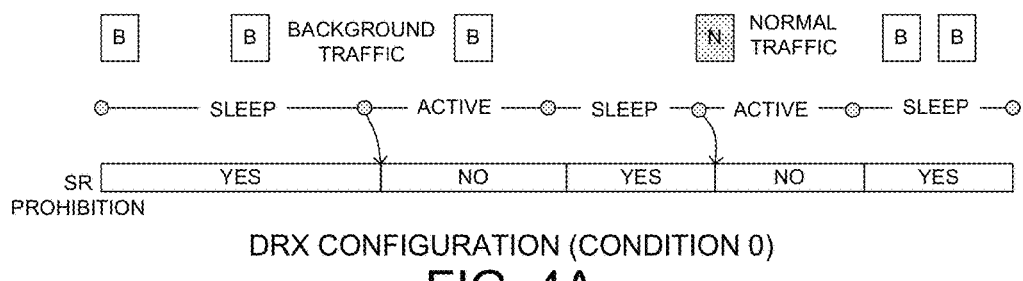
FIG. 4A illustrates a first triggering condition 0 for uplink shaping and SR transmission.

FIG. 4A illustrates a triggering condition 0 for uplink shaping and SR transmission. If DRX operation is configured, then SR transmission is only performed when UE is in active state (active period) for background traffic. In addition, an eNB may configure the SR period to be align with the DRX cycle and SR offset to be overlapped with the period of OnDuration. As a result, the timing to send SR would be overlapped within active period and sleep period automatically becomes the period where SR prohibition is YES. For background traffic, if an UL packet arrives at a subframe upon active period, then the UE is allowed to send SR (SR prohibition is NO). Else, if an UL packet does not arrive at a subframe upon active period, then the UE is not allowed to send SR (SR prohibition is YES). In other words, the triggering condition 0 for SR transmission is the UE entering the active period for background traffic type. For normal traffic type, however, the UE is allowed to send SR (SR prohibition is NO) and enter the active period at any time.

Figure 4B:
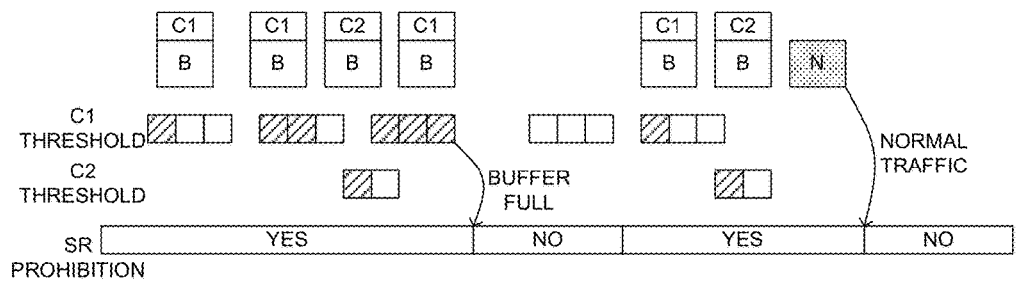
FIG. 4B illustrates a second triggering condition 1 for uplink shaping and SR transmission.

FIG. 4B illustrates a triggering condition 1 for uplink shaping and SR transmission. In this example, SR transmission is performed by UE only after a predefined buffer is full for at least one background traffic class or application type. In the example of FIG. 4B, traffic class C1 has a predefined buffer size (e.g., 3 packets), and traffic class C2 has another predefined buffer size (e.g., 2 packets). For background traffic type, the UE keeps buffering each packet according to its traffic class and prohibits SR transmission until a corresponding buffer is full. If the buffer for C1 is full, then the UE no longer prohibits SR transmission. If the uplink traffic has a normal traffic type, then the UE stops SR prohibition right away, regardless of whether each of the buffers is full or not.

The buffer size can be interpreted as number of packets or total size of packets, e.g., 3 packets in the buffer or 1600 bytes in the buffer. The buffer size can be decided by 1) UE-specific physical memory size in the device (e.g., 10% memory full); 2) buffer size threshold can be specified by the network (e.g., number of bytes that can be carried in a single subframe, which is calculated assuming certain channel quality and corresponding MCS (modulation and coding scheme)); 3) type of application (e.g., different applications can have different buffer size thresholds).

When this mechanism is used, the timing of stopping shaping may become unpredictable and QoS may be degraded severely. Therefore, this mechanism can be applied to selective traffics, e.g., best efforts, while delay sensitive traffics, e.g., signaling, can skip applying this mechanism. If controller is an eNB, the eNB can signal the buffer size threshold to UE. The threshold can be broadcasted, unicasted, or predefined.

Figure 4C:
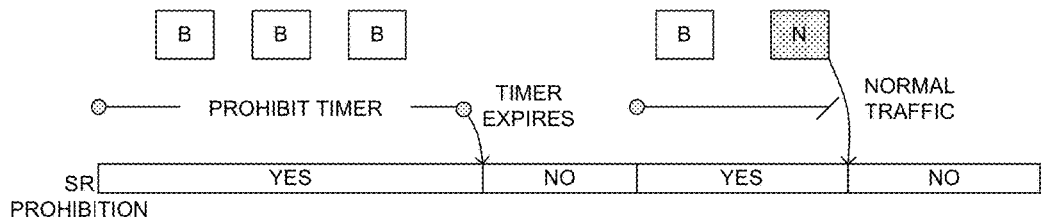
FIG. 4C illustrates a third triggering condition 2 for uplink shaping and SR transmission.

FIG. 4C illustrates a triggering condition 2 for uplink shaping and SR transmission. In this example, for background traffic, a prohibit timer is used to prohibit SR transmission until the timer expires. While the timer is running, UE buffers uplink packets and is not allowed to transmit SR. Only when the timer is expired, the UE is allowed to transmit SR and upload the buffered packets for uplink transmission. The prohibit timer is re-started upon buffer becomes empty and/or the UE enters DRX sleep period. For normal traffic type, the UE is allowed to transmit SR once packet arrives regardless whether the prohibit timer is running or not.

In this example, the triggering condition for SR transmission is based on periodic access via the prohibit timer. The value of the prohibit timer may be decided by the UE, eNB, or MME. The value may be decided according to a long DRX cycle, a short DRX cycle, an SR period, and/or one or more other DRX parameters. The value may be decided according to QoS requirement. An example is to set the value according to the QoS requirement of the existing bearer. Therefore, the prohibit timer would be UE-specific and based on at least one of the running applications.

Figure 4D:
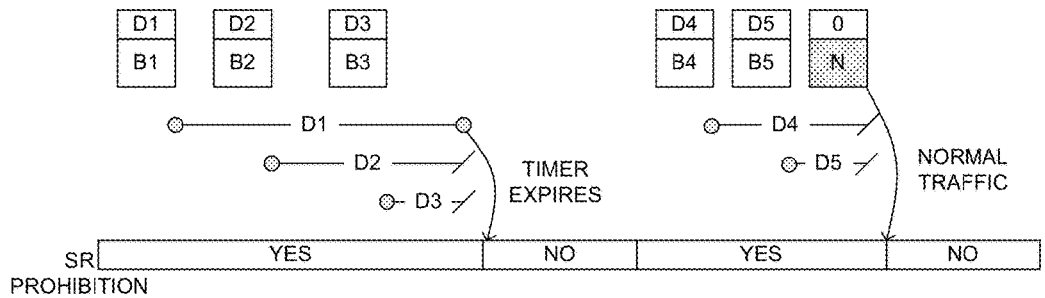
FIG. 4D illustrates a fourth triggering condition 3 for uplink shaping and SR transmission.

FIG. 4D illustrates a triggering condition 3 for uplink shaping and SR transmission. In this example, SR prohibition is stopped when at least one of the buffered data is going over its maximum tolerable delay. Such mechanism can bound the delay for concerned applications. For different type of background traffic and application, a different delay timer is assigned to each packet. For example, delay values of D1, D2, and D3 are assigned to three background packets B1, B2 and B3 of different applications respectively. When packet B1 has reached its delay bound D1, the triggering condition for SR transmission is satisfied.

The delay constraint shall consider the latency of periodic SR. The UE needs to record arriving timing and count the delay of each individual packet or application. For example, for the data of the same application, the UE only needs to count the delay of the first packet. For normal traffic type, the UE is allowed to transmit SR once packet arrives regardless whether the delay timer is running or not. For example, delay values of D4 and D5 are assigned to two background packets B4 and B5 respectively. When normal packet N arrives, the UE is allowed to transmit SR immediately although none of the delay timers for D1 and D2 has expired yet.

Figure 4E:
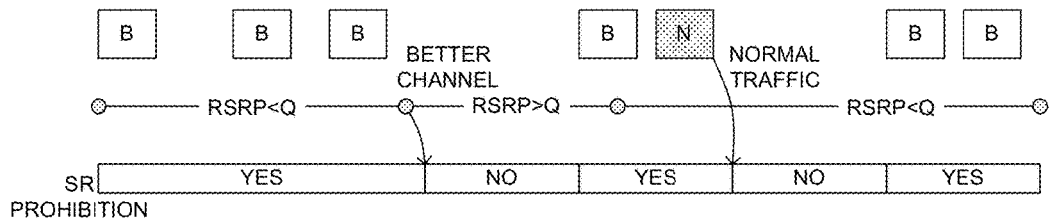
FIG. 4E illustrates a fifth triggering condition 4 for uplink shaping and SR transmission.

FIG. 4E illustrates a triggering condition 4 for uplink shaping and SR transmission. In this example, SR transmission is performed only when UE's channel quality is above a predefined threshold, or the estimated transmit power is lower than certain threshold, or the estimated path loss is lower than certain threshold. The UE can determine the channel quality and the estimated TX power by 1) DL pathloss measurement; 2) preamble power ramping; and 3) camping cell measurement such as RSRP/RSRQ. When using transmit power as the SR constraint, the purpose is to prevent UE initiating SR transmission in bad coverage and waste extra power on delivering the same amount of data. If the required transmit power is higher than the predefined threshold or channel quality is lower than the predefined threshold, and if the data is delay tolerant (background traffic), the UE delays the UL transmission until the channel becomes better for certain amount of time. If controller is an eNB, the eNB needs to specify the constraint.

Figure 4F:
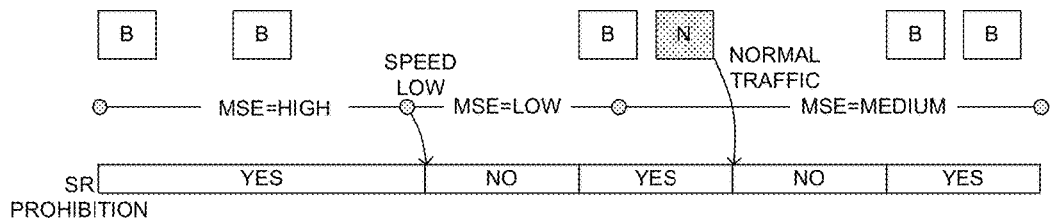
FIG. 4F illustrates a sixth triggering condition 5 for uplink shaping and SR transmission.

FIG. 4F illustrates a triggering condition 5 for uplink shaping and SR transmission. In this example, SR transmission is performed when UE speed is lower than a defined threshold. For background traffic, when UE speed is high, the UE is not allowed to transmit SR. Uplink shaping and SR prohibition is stopped when UE speed is low whereby the UE will be kept in RRC Connected longer due to less handovers. The UE can determine its speed by counting its cell change count or using physical speed. The UE speed may be determine based on mobility state estimation (MSE) performed by the UE. For example, MSE=normal corresponds to UE speed low for satisfying SR transmission triggering condition, while MSE=medium and MSE=high correspond to UE speed high. If controller is an eNB, the eNB needs to specify the threshold or qualification of UE speed for SR prohibition.

It is expected that different uplink shaping and SR prohibition mechanisms may have different advantages and disadvantages. The controller may choose one of the mechanism or a hybrid implementation to meet its requirement. For example, UE can determine to apply which mechanism and triggering condition(s) based on at least one of the channel quality of the UE, the UE speed, a UE battery life, a UE screen status, network loading, traffic type, a number of SR, and configured RRC parameters.

Figure 5:
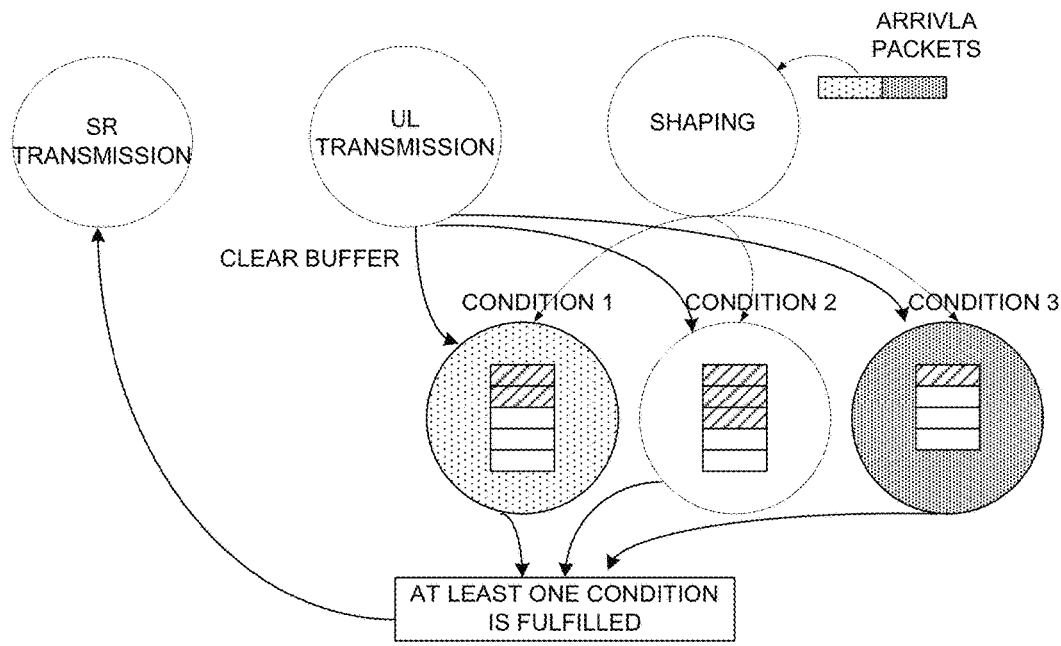
FIG. 5 illustrates one embodiment of hybrid uplink shaping for RRC Connected mode.

FIG. 5 illustrates one embodiment of hybrid uplink shaping for RRC Connected mode. In the embodiment of FIG. 5, the UE may label the arrived packets and apply different shaping conditions and track the shaping state individually. For example, packets belonged to best effort services may apply to shaping condition 1 (buffer size threshold), and alternatively, packets belonged real-time services may apply to shaping condition 3 (delay bound constraint). Once at least one of the conditions was fulfilled, the UE would initiate SR transmission. After UL transmission, the UE clears the buffer and updates the corresponding shaping state.

Figure 6:
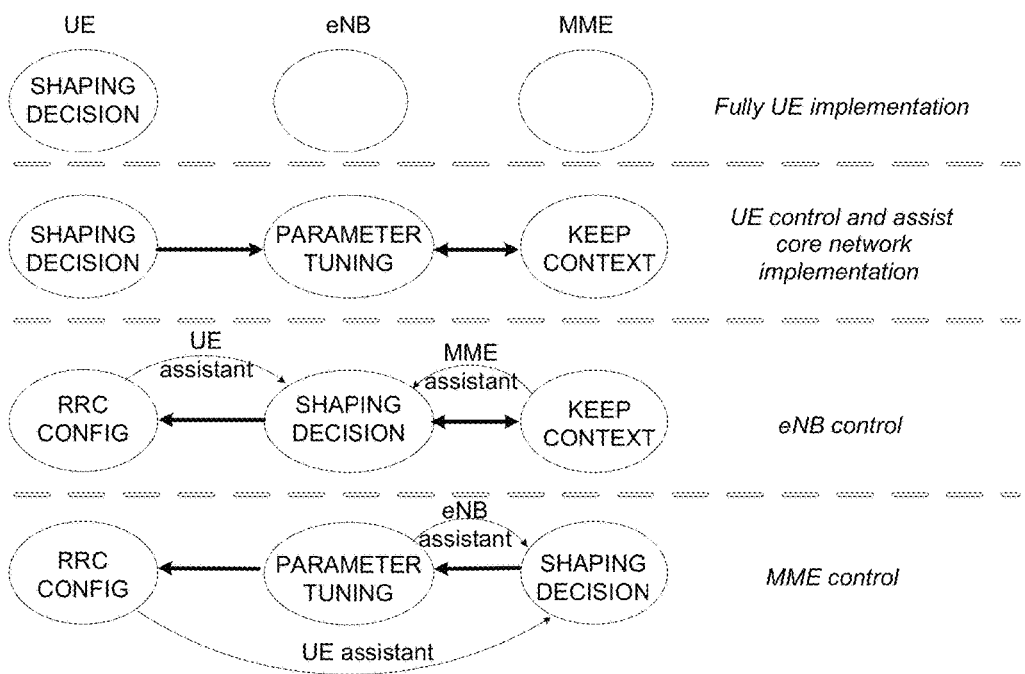
FIG. 6 illustrates various options for uplink shaping implementation.

FIG. 6 illustrates various options for uplink shaping implementation. There are four different implementation options. In a first option, uplink shaping is based on full UE implementation. The UE makes shaping decision on its own completely. In a second option, uplink shaping is based on UE control and network assistance. In a third option, uplink shaping is based on eNB control, possibly with UE and MME assistance. In a fourth option, uplink shaping is based on MME control, possibly with UE and eNB assistance.

With full UE implementation, UE decides which shaping mechanisms and associated settings are used for its uplink packets and UE could automatically activate and deactivate shaping and determine whether SR prohibition is YES or NO. UE may activate the uplink shaping when the UE 1) is in background mode; 2) batter level is low; 3) moving with high speed; 4) the screen is OFF; 5) frequent SR transmission is identified; and 6) channel quality is not good. Under full UE implementation, no negotiations are required between UE and eNB, and MME is unaware of the shaping. Therefore, there is no signaling over the air under this implementation. When periodic access is applied (e.g., condition 2 in FIG. 4C), a reasonable implementation is to overlay the period where SR prohibition is NO to be located within the active period (e.g., active period covers the non-SR prohibition period). Furthermore, the UE is able to change the shaping mechanism dynamically (e.g., apply different shaping mechanisms based on application/user status).

Figure 7:
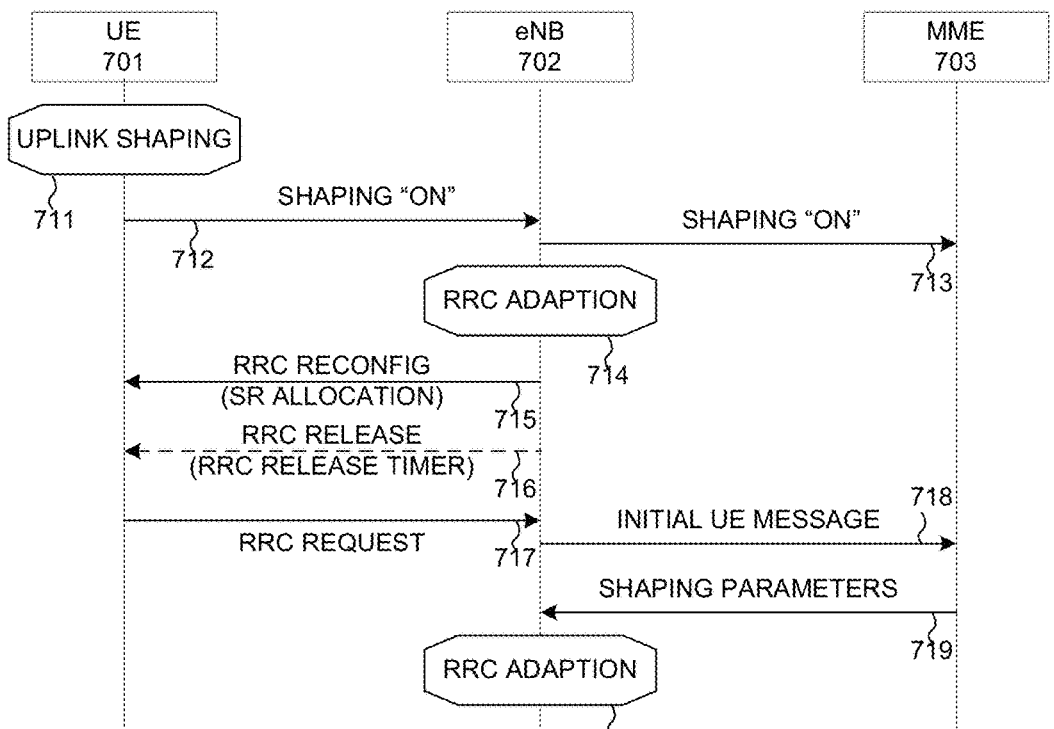
FIG. 7 illustrates one embodiment of UE-controlled and network-assisted uplink shaping signaling procedure.

FIG. 7 illustrates one embodiment of UE-controlled and network-assisted uplink shaping signaling procedure. In this embodiment, UE decides the shaping mechanism and parameters and then reports the decision to eNB. The UE may choose to only indicate whether uplink shaping is ON or is OFF. In addition, the UE may report the uplink shaping information and omit the indication if the serving cell or the shaping mechanism remains the same. Once the UE changes the shaping mechanism or changes eNB, it updates the information to eNB.

When the UE reports the shaping parameters, the eNB could reconfigure a RRC release timer and SR period based on the report. The eNB may further configure a contention-free random access procedure to the UE if the eNB is informed the prohibit timer. The contention-free random access comprises a dedicated PRACH slot or a dedicated preamble code. The eNB may also forward the information to MME and the MME stores the context. Furthermore, the eNB may forward the information to the target eNB while performing inter-eNB negotiation during HO, the MME may forward the information to a new eNB, and the MME may release the context upon UE detach or when a timer expires. The timer is started or restarted upon each time the UE comes back to the network.

In the example of FIG. 7, in step 711, UE 701 activates uplink shaping based on certain criteria. In step 712, UE 701 indicates shaping "ON" to eNB 702, e.g., through RRC message such as RRC setup complete message. In step 713, eNB 702 forwards the corresponding shaping information to MME 703 by initial UE message. In step 714, eNB 702 performs RRC adaptation based on the shaping information. In one example, eNB 702 reconfigures the SR allocation (period and/or offset) based on shaping mechanism, and sends RRC reconfiguration message to UE 701 (step 715). In another example, eNB 702 adapts the RRC release timer based on the reporting. Such adaptation may be informed to UE 701 when releasing RRC connection (step 716). Once UE 701 re-establishes RRC connection after sending an RRC request in step 717, UE 701 may skip the negotiation but MME 703 will forward shaping information to eNB 702 (step 719) by initial context setup request message (step 718). Finally, eNB 702 performs RRC adaptation based on the shaping information (step 720).

Figure 8A:
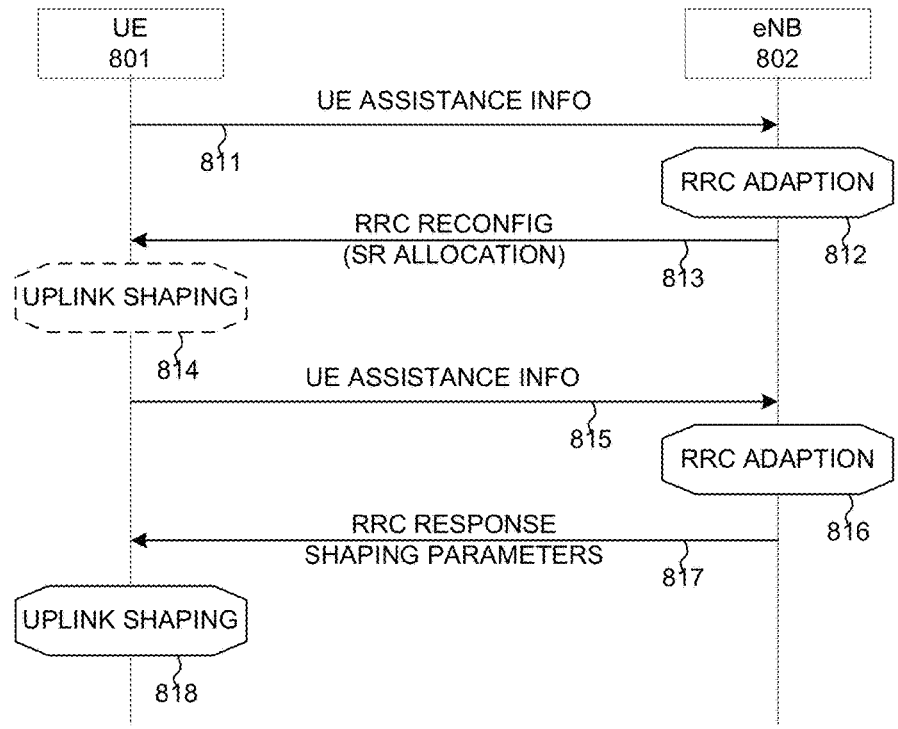
FIG. 8A illustrates one embodiment of eNB-controlled uplink shaping signaling procedure.

FIG. 8A illustrates one embodiment of eNB-controlled uplink shaping signaling procedure. In this embodiment, the eNB configures shaping parameters and activate/deactivate the shaping. The activation and deactivation could be signaled by SIBS, RRC message, or MAC CE. The activation and deactivation of shaping may be implied by shaping configuration. When a default configuration is broadcasted, UE activates shaping when it enters RRC Connected mode. The eNB may activate uplink shaping 1) when the cell loading is heavy (larger than a threshold); 2) to prevent high speed UE accessing the cell (UE speed higher than a threshold); 3) to prevent UE with bad coverage accessing the cell (channel quality worse than a threshold); 4) to prevent UE with frequent SR transition accessing the cell (more frequent than a threshold); 5) to prevent UE with small data accessing the cell (smaller than a threshold); and 6) to prevent UE with degrading power saving under DRX operation. The shaping configuration can use a defined profile with a shaping ID. When handover, the source eNB forwards the shaping configuration information to the target eNB and the target eNB decides whether to keep or change the shaping configuration. When the UE is released to RRC Idle mode, the shaping configuration is released. Alternatively, eNB only decides when to activate and deactivate the uplink shaping. When UE receives the indication, the UE then decides the shaping mechanism and corresponding parameters.

In the example of FIG. 8A, in step 811, UE 801 first sends UE assistance information to eNB 802. The assistance information includes: 1) UE speed information; 2) UE traffic pattern and RRC transition history; 3) power consumption preference; 4) the ability to support shaping; and 5) background mode. In step 812, eNB 802 performs RRC adaptation. In step 813, eNB 802 sends RRC reconfiguration to UE 801 with SR allocation. In step 814, UE 801 optionally performs uplink shaping depending on traffic type. In step 815, UE 801 sends UE assistance information to eNB 802 for additional purpose (e.g., more power saving request). In step 816, eNB 802 performs RRC adaptation again to re-configure the shaping parameters. In step 817, eNB sends RRC response message to UE 801 with shaping parameters. For example, if shaping periodic access (condition 2 in FIG. 4C) is used, eNB 802 configures the period where SR prohibition is NO to be located within active period (e.g., active period covers non-SR prohibition period). In step 818, UE 801 applies uplink shaping based on the configured shaping parameters. If eNB receives assistance information from both MME and UE, the assistance information from UE shall have higher priority than from MME. If MME provide help on storing shaping parameters, eNB shall upload the assistance information from UE to the MME.

Figure 8B:
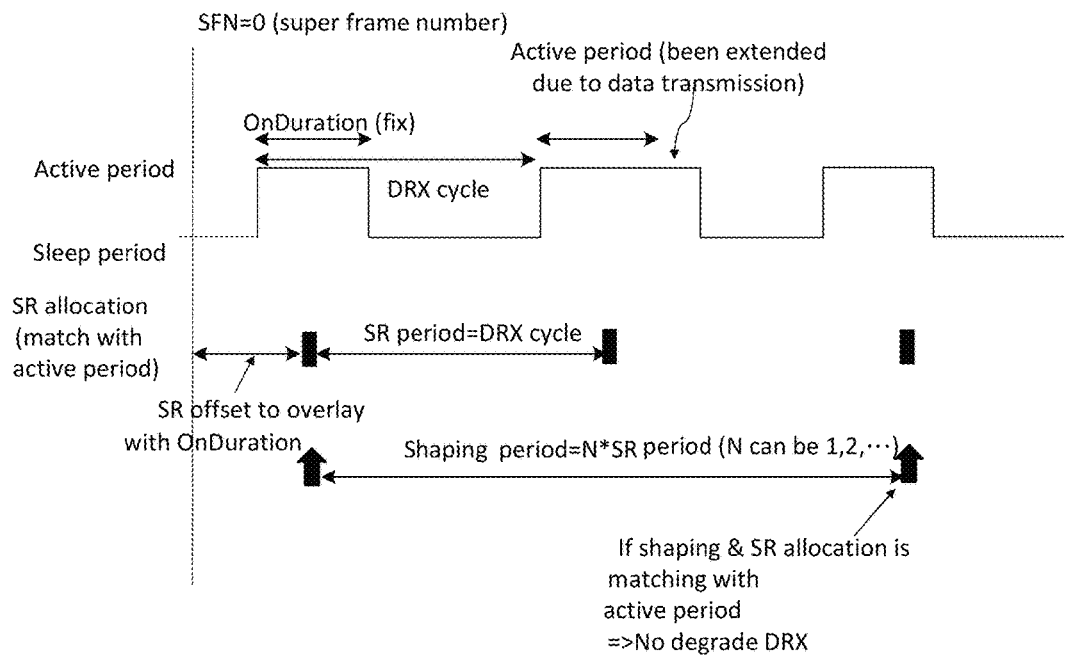
FIG. 8B illustrates eNB-controlled uplink shaping when SR allocation is matching with DRX operation.

FIG. 8B illustrates eNB-controlled uplink shaping when SR allocation is matching with DRX operation. When condition 0 is applied, eNB matches SR allocation with active period. The eNB configures the SR period to be align with the DRX cycle and SR offset to be overlapped with the period of DRX OnDuration. As a result, the timing to send SR is overlapped within the active period and the sleep period automatically becomes the period where SR prohibition is YES. In addition, when shaping periodic access (condition 2 in FIG. 4C) is used, eNB configures SR period to align with shaping period, e.g., shaping period=N*SR period (N=1, 2 . . . ). In other words, eNB configures the period where SR prohibition is NO to be located within active period (e.g., active period covers non-SR prohibition period).

Figure 9:
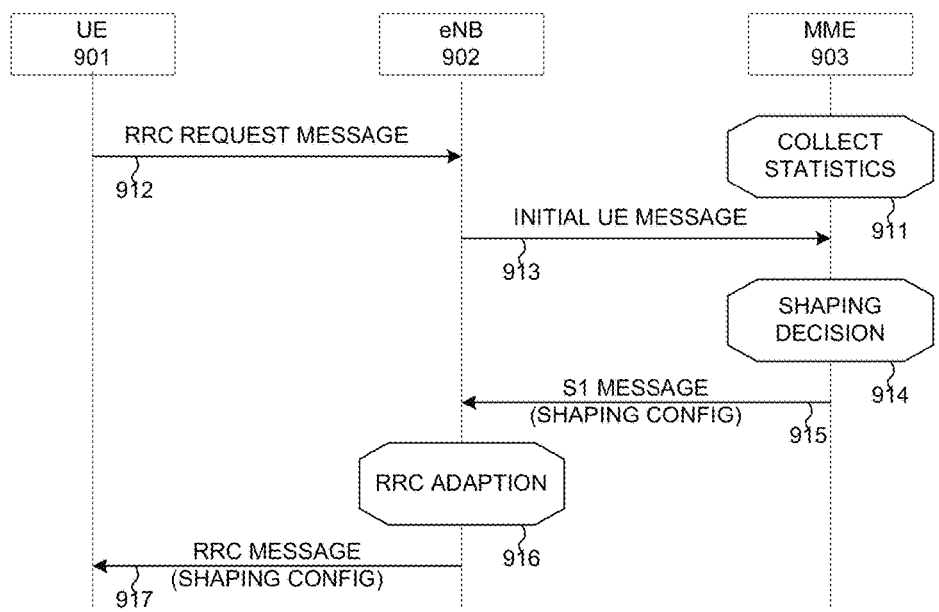
FIG. 9 illustrates one embodiment of MME controlled uplink shaping signaling procedure.

FIG. 9 illustrates one embodiment of MME-controlled uplink shaping signaling procedure. In this embodiment, the MME collects statistics and recommends the shaping mechanism and corresponding parameters to the UE and the eNB. The statistics may include 1) UE cell change count per unit time; 2) UE RRC transition count per unit time; 3) UE traffic inter-arrival time; 4) UE tracking area update count per unit time; 5) the average duration of UE in RRC Connection mode, 6) UE class (e.g., M2M device), and 7) subscription plan. The MME may initiates the statistics when the loading is high and the reduction of signaling overhead is required, when a default bearer is configured but traffic pattern is diverse, or when UE capability supports shaping.

In the example of FIG. 9, in step 911, MME 903 stores UE context and collects statistics. In step 912, UE 901 sends RRC request message to eNB 902. In step 913, eNB 902 sends initial UE message to MME 903. Based on the statistics, MME could suggest eNB to tune its RRC parameters, e.g., shaping configuration. Alternatively, eNB may forward its RRC parameter to MME as assistant information for deciding the shaping mechanism. UE may also provide assistance information such as traffic pattern to MME through new procedure or existing signaling. In the example of FIG. 9, in step 914, MME 903 makes shaping decision and forwards the shaping configuration to eNB 902 (step 915). In step 916, eNB 902 performs RRC adaptation based on the shaping configuration. Finally, in step 917, eNB 902 sends shaping configuration to UE 901 via RRC messaging.

Figure 10:
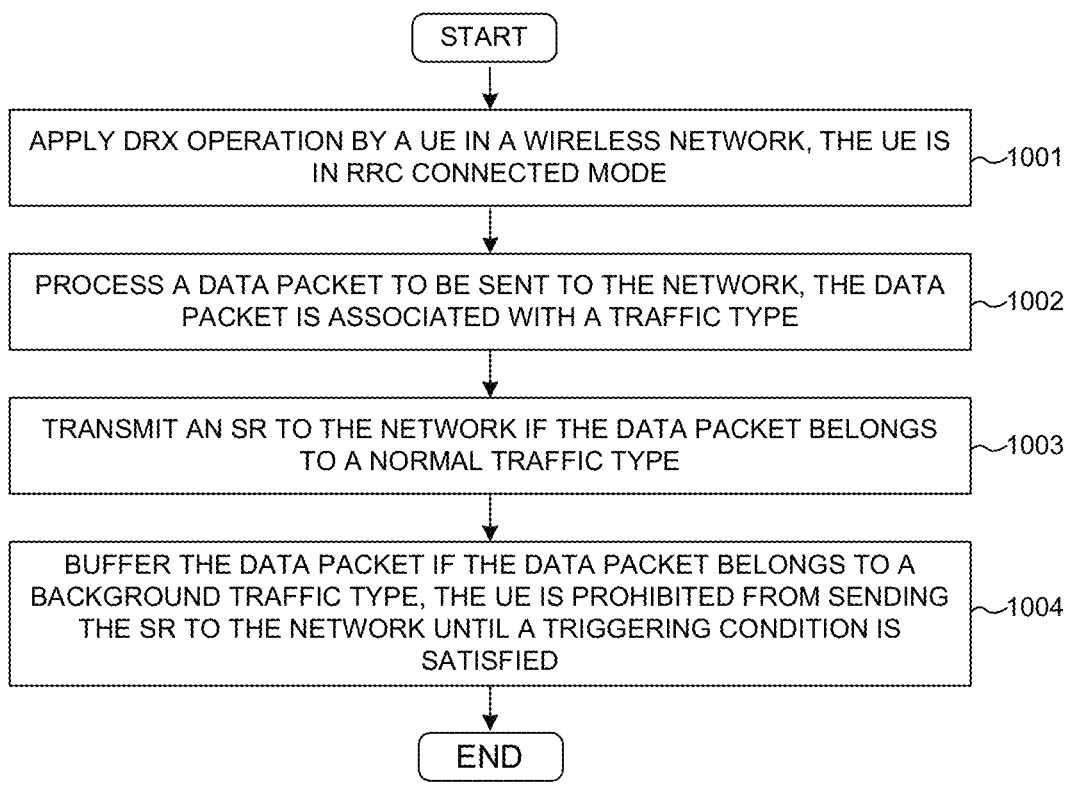
FIG. 10 is a flow chart of a method of UE uplink shaping and SR prohibition in RRC Connected mode in accordance with one novel aspect.

FIG. 10 is a flow chart of a method of UE uplink shaping and SR prohibition in RRC Connected mode in accordance with one novel aspect. In step 1001, a UE applies DRX operation in a wireless network, the UE is in RRC Connection mode. In step 1002, the UE processes a data packet to be sent to the network. The data packet is associated with a traffic type. In step 1003, if the data packet belongs to a normal traffic type, then the UE transmits a scheduling request (SR) to the network. In step 1004, if the data packet belongs to a background traffic type, then the UE buffers the data packet and is prohibited from sending the SR to the network until a triggering condition is satisfied. The background traffic type is associated with UE in a background mode and/or the data packet has a low QoS requirement and/or the data packet has a small packet size.

In one embodiment, the triggering condition is at least one of fulfilling the UE entering an active period of the DRX operation, the buffered data has reached a predefined buffer size threshold, the SR has been delayed for a predefined periodicity, at least one of the buffered data packets has reached a delay bound, a channel quality is above a channel quality threshold, and a UE speed is slower than a speed threshold.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
applying a discontinuous reception (DRX) operation by a user equipment (UE) in a wireless network, wherein the UE is in radio resource control (RRC) Connected mode;
processing a data packet to be sent to the network, wherein the data packet is associated with a traffic type;
transmitting a scheduling request (SR) to the network if the data packet belongs to a normal traffic type;
selecting a plurality of triggering conditions based on a plurality of UE conditions, wherein the UE condition comprising: the channel quality of the UE, the UE speed, a UE battery life, a UE screen status, network loading, traffic type, a number of SR, and configured RRC parameters; and
buffering the data packet if the data packet belongs to a background traffic type, wherein the UE is prohibited from sending the SR to the network until at least one of the selected triggering conditions is satisfied.

2. The method of claim 1, wherein the background traffic type is associated with UE in a background mode and/or the data packet has a low QoS requirement and/or the data packet has a small packet size.

3. The method of claim 1, wherein the UE is either in sleep state or active state during the DRX operation, and wherein the triggering condition is the UE entering the active state.

4. The method of claim 1, wherein the triggering condition is at least one of fulfilling a predefined buffer, delaying the SR for a periodicity, at least one of the buffered data packets has reached a delay bound, a channel quality is above a channel quality threshold, and a UE speed is slower than a speed threshold.

5. The method of claim 4, wherein the predefined buffer size is based on at least one of a physical memory size, a number of bytes carried in each subframe, and one or more running applications on the UE.

6. The method of claim 4, wherein the periodicity is based at least one of a prohibit time determined by the UE, a prohibit time determined by a serving base station, and a prohibit time determined by a mobility management entity (MME).

7. The method of claim 6, wherein a value of the prohibit time is decided according to at least one of a long DRX cycle, a short DRX cycle, an SR period, and/or one or more other DRX parameters.

8. The method of claim 4, wherein the delay bound is controlled by a common value determined by the UE and/or one or more running applications on the UE.

9. The method of claim 1, further comprising:
sending an indication to the network whether SR prohibition is applied and related parameters.

10. The method of claim 9, wherein the UE receives an RRC release timer and/or SR configuration from the network based on the indication.

11. The method of claim 1, wherein the UE receives control information related to SR prohibition from the network.

12. The method of claim 11, wherein the control information comprises information on configuring the predefined buffer size, configuring the periodicity, and/or activating/deactivating the SR prohibition.

13. A user equipment (UE), comprising:
a discontinuous reception (DRX) circuit that operates the UE in a DRX operation a wireless network, wherein the UE is in radio resource control (RRC) Connected mode;
an uplink shaping circuit that processes a data packet to be sent to the network and selects a plurality of triggering conditions based on a plurality of UE conditions, wherein the UE condition comprising: the channel quality of the UE, the UE speed, a UE battery life, a UE screen status, network loading, traffic type, a number of SR, and configured RRC parameters, and wherein the data packet is associated with a traffic type;
a transmitter that transmits a scheduling request (SR) to the network if the data packet belongs to a normal traffic type; and
a data buffer that buffers the data packet if the data packet belongs to a background traffic type, wherein the UE is prohibited from sending the SR to the network until at least one of the selected one or more triggering conditions is satisfied.

14. The UE of claim 13, wherein the background traffic type is associated with UE in a background mode and/or the data packet has a low QoS requirement and/or the data packet has a small packet size.

15. The UE of claim 13, wherein the UE is either in sleep state or active state during the DRX operation, and wherein the triggering condition is the UE entering the active state.

16. The UE of claim 13, wherein the triggering condition is at least one of fulfilling a predefined buffer, delaying the SR for a periodicity, at least one of the buffered data packets has reached a delay bound, a channel quality is above a channel quality threshold, and a UE speed is slower than a speed threshold.

17. The UE of claim 13, wherein the UE sends an indication to the network whether SR prohibition is applied and related parameters.

18. The UE of claim 17, wherein the UE receives an RRC release timer and/or SR configuration from the network based on the indication.

* * * * *